No. 884,933. PATENTED APR. 14, 1908.
C. KESLER.
NUT LOCK.
APPLICATION FILED JAN. 4, 1908.
Fig. 1.
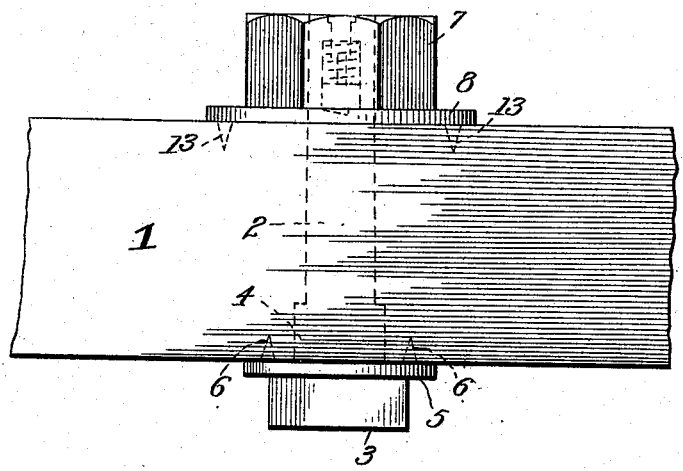
Fig. 5.
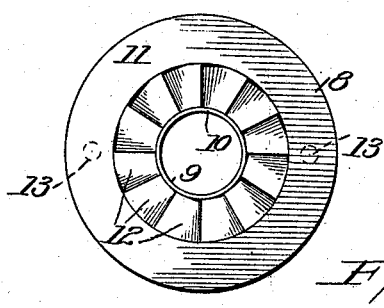
Fig. 3.
Fig. 4.
Fig. 2.
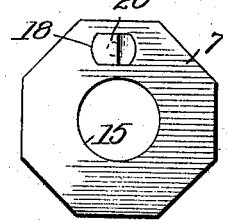
Fig. 6.
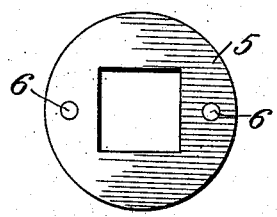
Inventor
Charles Kesler.
Witnesses
C. H. Walker.
A. J. Walker.
By E. E. Vrooman,
his Attorney.

UNITED STATES PATENT OFFICE.

CHARLES KESLER, OF MARION, OHIO.

NUT-LOCK.

No. 884,933.

Specification of Letters Patent.

Patented April 14, 1908.

Application filed January 4, 1908. Serial No. 409,333.

*To all whom it may concern:*

Be it known that I, CHARLES KESLER, a citizen of the United States, residing at Marion, in the county of Marion and State of Ohio, have invented certain new and useful Improvements in Nut-Locks, of which the following is a specification, reference being had therein to the accompanying drawing.

This invention relates to improvements in nut locks, and has for its object the provision of means for facilitating the fastening of a nut upon a bolt against independent, rotary movement.

Another object of the invention is the construction of a locking device for a nut, which comprises a minimum number of parts, which is comparatively simple to construct, and inexpensive to manufacture.

A further object of the invention is the construction of a device for holding a nut upon a bolt against accidental displacement, and the means for accomplishing this result is capable of adjustment for permitting the nut to be quickly removed or detached from the bolt or its support by the operator manipulating a part of the fastening device.

With these and other objects in view, the invention consists of certain novel constructions, combinations, and arrangements of parts, as will be hereinafter fully described and claimed.

In the drawings: Figure 1 is a view in side elevation of a device constructed in accordance with the present invention. Fig. 2 is a vertical, sectional view of the nut and washer. Fig. 3 is a bottom view of a nut constructed in accordance with the present invention. Fig. 4 is a perspective view of the hollow threaded member of my device. Fig. 5 is a plan view of the primary washer. Fig. 6 is an inverted view of the auxiliary washer.

Referring to the drawings by numerals, 1 designates any kind of a support, which I have illustrated, for the purpose of showing the operation or application of my device.

The bolt 2 (dotted lines) is provided with a head 3 and a squared shoulder 4. The auxiliary washer 5 is provided with a squared aperture or opening, which fits around the squared portion 4 of the bolt. The washer 5 is provided with prongs or projections 6, which are adapted to extend into the support 1. By reason of these projections or prongs 6 engaging and gripping the support 1, the bolt will be held against independent rotary movement upon the support. The upper or outer end of the bolt 2 projects through the support 1, and threaded thereon is a nut 7.

Positioned between the nut 7 and the support 1, is a primary washer 8. The washer 8 is provided with a central aperture 9 and with an inner, annular rim 10 and an outer, comparatively large rim 11. Formed between the inner and outer rims is a ratchet or ratchet-teeth 12. Projecting from the under face of the washer 8 are projections or lugs or extensions 13, similarly-constructed to the extension 6. These extensions 13 are adapted to engage the support 1 for preventing the primary washer 8 from having independent rotary movement thereon. The nut 7 is provided with a central, threaded aperture 15, whereby the same may be threaded upon the bolt 2. The nut 7 is provided with a socket 16 terminating at its lower end in an auxiliary aperture 17; the auxiliary aperture 17 terminating at its lower end in an enlarged compartment 18.

A pawl or dog-member 19, provided with a tooth or sharpened projection 20, is provided upon its upper or inner end with a threaded stem 21. The stem 21 is fixedly secured, at its lower end, to the pawl-member 19. Within the spring-compartment 18, is positioned, preferably, a spiral spring 22, which has its larger portion bearing against the upper end of the compartment, and its lower or narrowest end bearing against the top of the dog-member 19. The rotatable, hollow, threaded member 23, Fig. 4, is provided with a body 24 and a head 25. The head 25 normally rests in the socket or cut-out portion 16 of the nut 7. The cylindrical or tubular body portion 24 is threaded upon the threaded stem 21, so that the pawl member or dog 19 can be raised and lowered at the will of the operator. The head 25 is provided with, preferably, a pair of horizontal notches 26, which are adapted to receive a screw-driver or like instrument, when it is desired to rotate the hollow member for raising or lowering the dog or pawl-member 19.

The rotatable member 23 is open at both ends, that is, the hollow body 24 is open at its bottom, as well as the top, so that if any foreign substance should collect in the rotatable member 24, the same can be easily forced out of the hollow body, by threading the upper end of the stem flush with the upper face of the head 25.

Prior to the positioning of the nut 7 upon the bolt, the rotatable member 23 is rotated sufficiently to permit the dog or pawl member 19 to extend below the nut, so that when the nut has been threaded into engagement with the primary washer, the pawl-member or dog can ride over the ratchet-teeth, and when the nut is tight against the primary washer, it will prevent the nut from accidentally working loose or being removed off the bolt. It is, therefore, obvious that I have provided an efficient locking device, which through the medium of the spring 22, normally engages the ratchet-teeth of the primary washer and normally holds the nut in a tight or adjusted position. It will, therefore, be seen that I have provided a fastening device comprising a bolt, a washer carried by the bolt, a nut threaded upon the bolt, and a peculiarly-constructed means for locking or holding the nut against independent, rotary movement upon the washer.

If it is desired to remove the nut, this can be accomplished by the operator rotating or threading the member 23 upon the threaded stem or shank 21, causing the dog or pawl-member 19 to be drawn inward or upward from in engagement with the teeth 12 of the primary washer. This adjustment of the dog or pawl member can be quickly accomplished, and, therefore, it will be seen that I have provided means for lifting the dog or pawl-member and holding the same in its lifted position without the operator grasping or gripping the nut. Consequently, I can use the nut for any ordinary purpose, in which a nut lock is not desired, and at the same time as a device, which will be susceptible of locking a nut upon a bolt or support. Furthermore, my locking device can be entirely positioned between the upper and lower faces of the nut, especially if it is not desired to have the locking device, upon the nut, perform the function of a nut lock.

What I claim is:

1. In a nut lock, the combination with a bolt, a washer provided with a ratchet, carried by said bolt, of a nut threaded upon said bolt, and normally in engagement with said washer, a pawl-member provided with a threaded stem, carried by said nut and normally engaging the ratchet portion of said washer, and a rotatable member carried by said nut and threaded upon said stem and being capable of adjusting the pawl-member relative to said washer.

2. In a nut lock, the combination with a bolt, a washer provided with a stop or roughened portion, carried by said bolt, a nut threaded upon said bolt, of a bodily movable locking device carried by said nut and adapted to engage said stop or roughened portion, said device comprising a pair of members capable of adjustment one threaded upon the other, and one of said members provided with a pawl or dog and adapted to engage the stop or roughened portion of the washer for holding the nut against independent rotary movement therewith.

3. In a nut lock, the combination with a bolt, a washer provided with a ratchet face, upon said bolt, a nut threaded upon said bolt in engagement with said washer, of a pawl-member provided with a threaded stem and engaging the ratchet face of the washer, said pawl-member carried by said nut, a rotatable member provided with a hollow body open at its upper and lower ends, said member threaded upon said stem, said member provided with a head having notches, the notches opening at their inner ends upon the upper open end of the body, and means for normally exerting a downward pull or inward pressure upon said pawl-member.

4. In a nut lock, the combination with a support, a bolt extending through said support, of a washer positioned upon said bolt and provided with depending prongs, the prongs extending into said support, said washer provided with a central aperture and with an annular flange, said washer provided with an outer flange, said washer provided with a continuous, uninterrupted circular line of ratchet-teeth between said inner and outer flanges, each tooth integral at its ends with two contiguous teeth, a nut threaded upon said bolt, and means carried by said nut and engaging said ratchet-teeth for normally holding the bolt against independent rotary movement upon said washer.

In testimony whereof I hereunto affix my signature in presence of two witnesses.

CHARLES KESLER.

Witnesses:
A. BARRON,
H. W. DORNITHEN.